United States Patent [19]
Baüder

[11] 4,266,571
[45] May 12, 1981

[54] FUEL METERING VALVE

[75] Inventor: Armin Baüder, Neckarsulm, Fed. Rep. of Germany

[73] Assignee: Audi NSU Auto Union Aktiengesellschaft, Fed. Rep. of Germany

[21] Appl. No.: 14,544

[22] Filed: Feb. 23, 1979

[30] Foreign Application Priority Data

Mar. 9, 1978 [DE] Fed. Rep. of Germany ....... 2810177

[51] Int. Cl.³ ............................................ F16K 21/02
[52] U.S. Cl. ............................... 137/625.48; 123/455; 251/209
[58] Field of Search ................ 251/209; 123/140 MP, 123/139 AB, 455; 137/625.48

[56] References Cited

U.S. PATENT DOCUMENTS

| | | | |
|---|---|---|---|
| 2,384,078 | 9/1945 | Curtis | 251/209 |
| 3,688,754 | 9/1972 | Eckert | 123/139 AW |
| 3,946,714 | 3/1976 | Eckert et al. | 123/139 AW |
| 3,974,809 | 8/1976 | Stumpp et al. | 123/139 AW |

FOREIGN PATENT DOCUMENTS

| | | | |
|---|---|---|---|
| 75533 | 7/1954 | Netherlands | 251/209 |

*Primary Examiner*—Arnold Rosenthal
*Attorney, Agent, or Firm*—Kane, Dalsimer, Kane, Sullivan and Kurucz

[57] ABSTRACT

A fuel metering valve for fuel injection to an internal combustion engine, comprising a rotary valve piston movable in a valve cylinder and having a spiral groove cooperating with a number of spaced valve ports in the cylinder, each port of triangular cross-section. Fuel is admitted to one end of the spiral groove and delivered through the ports in the cylinder. Rotation of the piston progressively opens the ports simultaneously.

5 Claims, 6 Drawing Figures

FUEL METERING VALVE

BACKGROUND OF THE INVENTION

This invention relates to a fuel control or metering valve for fuel injection apparatus for a mixture compressing spark ignition internal combustion engine provided with continuous injection. In particular the invention is concerned with a valve having a piston rotatable in a cylinder to control the throttle cross-section of a port in the cylinder wall.

With a fuel metering valve of the type mentioned (known e.g. from German Specification 1934703), which is intended to permit accurate metering of fuel according to the internal combustion engine's operating conditions at any particular time, the throttle cross-section, which is variable for this purpose, is obtained, through rotation of the control piston relative to the control cylinder, by virtue of the fact that an oblique control edge on the control piston is moved across a rectangular port in the control cylinder, when the control piston rotates, as a function of the amount of air flowing through the induction manifold of the engine, the throttle cross-section changes in accordance with a sine curve. The result of this is that during rotation of the control piston between the smallest and largest throttle cross-sections an amount of fuel is metered each time, which, starting from the smallest throttle cross-section, initially increases more rapidly and, after about half the control piston's movement, increases more slowly. Such a metering pattern does not correspond to the amount of fuel required in all operating ranges. For example, the decrease or levelling-out in the increments of fuel dosage from halfway along the control piston's path—i.e. from half load to full load—results in a relative reduction in the amount of fuel in this operating range and thus in a thinning of the mixture fed to the internal combustion engine. A further disadvantage with the type of valve mentioned consists in the fact that it is only possible to provide one single port to interact with the control edge on the piston through which the fuel is metered even when several injection nozzles are used. If an injection nozzle becomes blocked in such an arrangement, the amount of fuel normally discharged through this injection nozzle will be transferred to the remaining injection nozzles, and this results in an increase in the proportions of noxious substances in the exhaust gas.

SUMMARY OF THE INVENTION

An object of the invention is to produce a fuel metering valve of the type referred to above, in which the disadvantages mentioned are avoided, and which will enable more accurate metering of fuel in all operating conditions.

Broadly stated the invention consists of a fuel control or metering valve for fuel injection apparatus for a mixture-compressing, spark ignition internal combustion engine with continuous injection, the valve having a control piston arranged to be rotatable in a control cylinder for metering an amount of fuel in accordance with the amount of air flowing through the induction manifold of the internal combustion engine, the piston having a spiral groove connected to a feed passage in the piston, one flank of the groove acting as a control edge which forms a variable throttle cross-section together with a port formed in the control cylinder, the port in the control cylinder having a generally triangular or tapered cross-section.

In a preferred embodiment of the invention, the spiral groove in the control piston does not run in a curve, but forms a uniformly ascending control edge which interacts with the triangular port in the control cylinder, and a quadratic ratio is achieved between the movement of the control piston and the throttle cross-section changed thereby over the whole range of possible metering. Thus by doubling the movement of the control piston a four-fold enlargement or reduction in the throttle cross-section can be obtained. As a result the fuel metering from the lower load range up to half-load extends over a considerably greater movement or angle of traverse of the control piston, than in the upper load range above it. Particularly in the lowest load range this extension or expansion permits extremely accurate fuel dosage in coordination with the inflowing amount of air, so that a more accurate composition of the mixture can be achieved, which furthermore involves a reduction of the proportions of noxious substances in the exhaust gas. However, the interaction of the spiral groove and the triangular port also allows several ports to be provided, through which fuel can be dosed and conveyed independently to each individual injection nozzle. A further advantage consists in the fact that the spiral groove can be made relatively simply. In the case of a metering valve with several discharge passages, several ports may be provided in the control cylinder, distributed around its circumference, and staggered along the cylinder axis relative to each other in conformity with the pitch of the spiral groove.

With a metering valve with several discharge ports it is also possible for the openings in the control cylinder to be disposed lengthwise parallel to the cylinder axis and spaced at distances from each other which are equal to the distances between adjacent threads of the spiral groove.

The axis of symmetry of the or each triangular port may lie parallel to the longitudinal axis of the control cylinder, and the lateral edges forming this vertex can be curved. This permits dosage, depending on the form of the triangular opening, of any amount of fuel relative to the amount of air drawn in by the internal combustion engine.

The invention may be performed in several ways and a number of embodiments will be described in greater detail below with reference to the accompanying drawings, in which.

DETAILED DESCRIPTION OF THE PREFERRED EMBODIMENT

Figure 1:
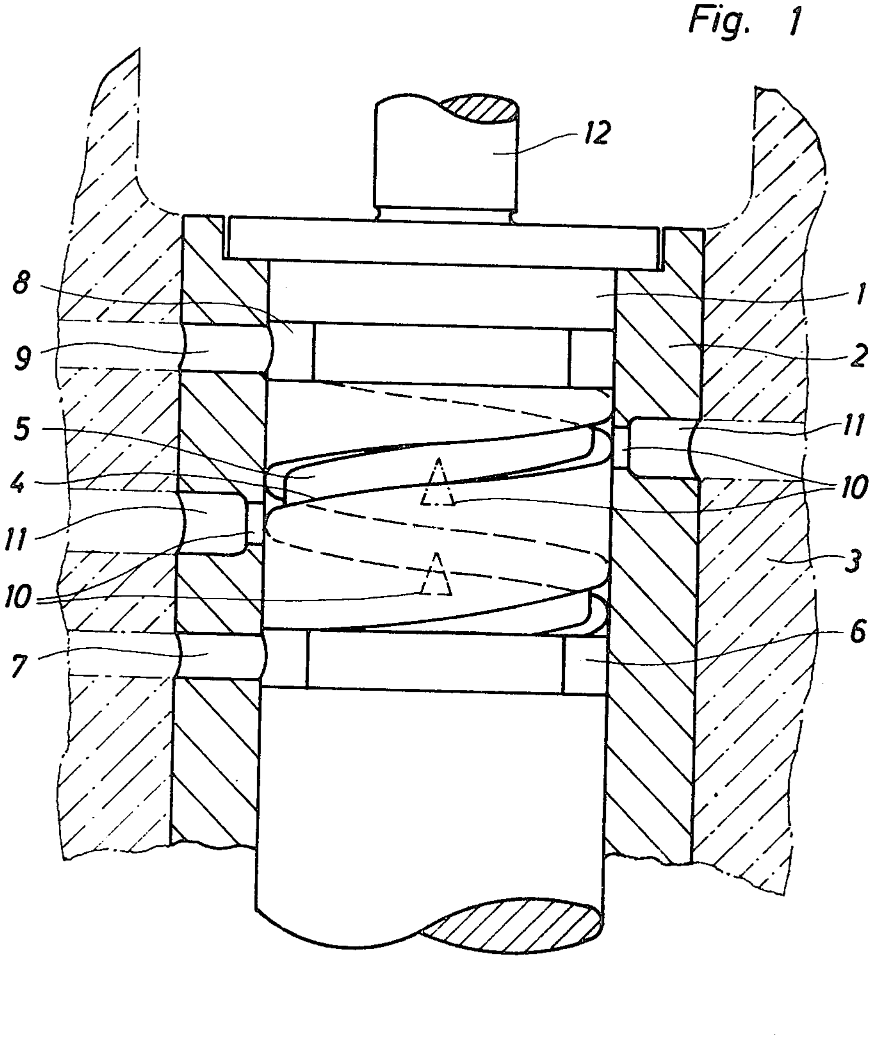
FIG. 1 is a longitudinal section through a fuel metering valve according to the invention with a control piston and a control cylinder shown in diagrammatic form.

FIG. 1 shows a fuel metering valve which essentially consists of a control piston 1 and a control cylinder 2 tightly mounted in a housing 3. The control piston 1 is arranged to be rotatable in the control cylinder 2 and has a control edge 4 which is formed by the groove flank of a spiral groove 5 of square cross-section. The groove 5 is connected via an annular groove 6 to a feed channel 7 and via an annular groove 8 to a return channel 9. In this constructional form there are provided in the control cylinder 2 four openings 10 of triangular cross-section which interact with the control edge 4 of the control piston 1 and in each case form a variable throttle cross-section. The openings 10 are distributed uniformly over the circumference of the control cylinder 2 and staggered relative to each other in conformity with the pitch of the spiral groove 5 along the length of the control cylinder 2. A discharge passage 11 adjoins each opening 10.

The fuel to be throttled is conveyed by a pump, which is not shown, via the feed channel 7 and the annular groove 6 into the groove 5 of the control piston 1. The control piston 1 is turned by means of the actuating shaft 12 according to an amount of air flowing through the induction manifold of an internal combustion engine (not shown), as a result of which a larger or smaller throttle cross-section is opened up by the control edge 4 of the groove 5 and the respective opening 10 and a corresponding amount of fuel is discharged via the discharge channel 11. The excess fuel flows out of the groove 5 via the return channel 9 into a storage tank which is not shown.

Figure 2:
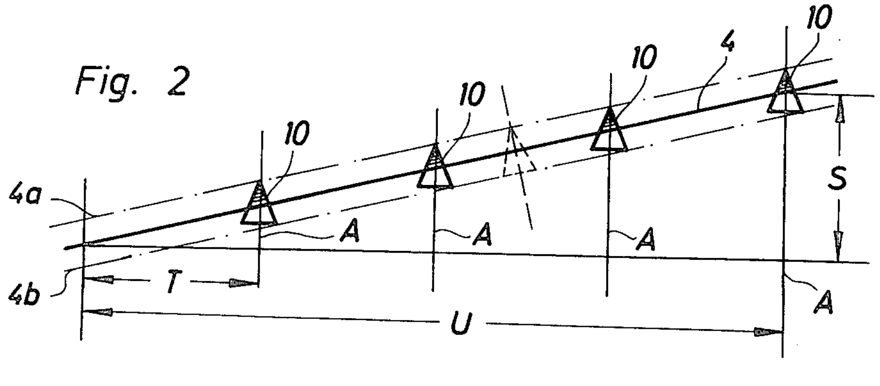
FIG. 2 is a diagram illustrating an arrangement of, for example, four openings distributed over the circumference of the control cylinder in FIG. 1.

FIG. 2 illustrates an arrangement of the four openings 10 (from FIG. 1) uniformly distributed over the circumference of the control cylinder 2 and staggered lengthwise—upwards in the drawing—in conformity with the pitch of the spiral groove 5. The circumference U is substantially identical with the circumference of the control piston 1 and the division T is a quarter of U in accordance with the total of four openings 10. The openings are preferably disposed so that the triangular openings— symmetrical axis A laid through the vertex runs roughly parallel to the longitudinal axis of the control cylinder 2. But it is also possible for the symmetrical axis to lie at right angles or vertically to the control edge 4, as shown in broken lines in this figure.

By this arrangement the same throttle cross-section is formed in each case when the control piston 1 is turned and the control edge 4 taken past the four openings 10. When the internal combustion engine's fuel injection plant is not operating, the control edge of the control piston 1 takes up the position along the dot-and-dash line 4*a*, whereas at full load the control edge runs roughly along the line 4*b*. In the position shown the control edge 4 and the openings 10 form a throttle cross-section which corresponds to a position in the lower load range and is shown hatched for greater clarity. It will be seen that a quadratic ratio exists between the movement of the control piston 1 as it turns, and the consequent change in throttle cross-section at the control edge 4 and the openings 10. This follows from the fact that a doubling of the displacement of the control piston involves a four-fold enlargement or reduction of the throttle cross-section. This enables a very accurate dosage corresponding to the fuel requirement at any particular time to be achieved from the lowest up to the middle load range.

Figure 3:
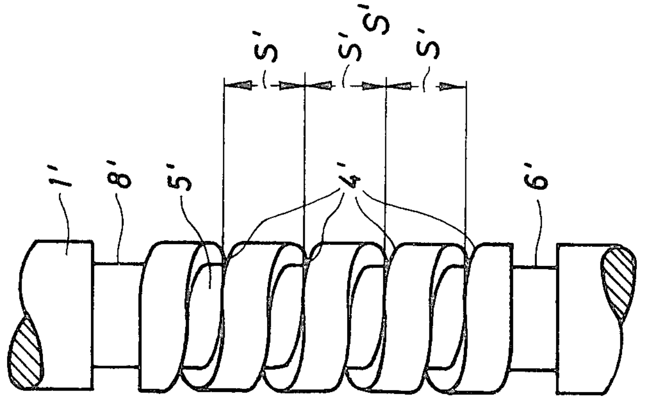
FIG. 3 is a front view of a second embodiment of a control piston.

In the constructional form shown in FIG. 3 the same reference symbols have been used as in FIG. 1, but with an added index. Essentially this constructional form differs from the construction form in FIG. 1 only in that the spiral groove 5' has a square thread with a number of pitches corresponding to the number of openings 10'. So to control four openings 10', for example, four control edges 4' are required, disposed lengthwise above each other.

Figure 4:
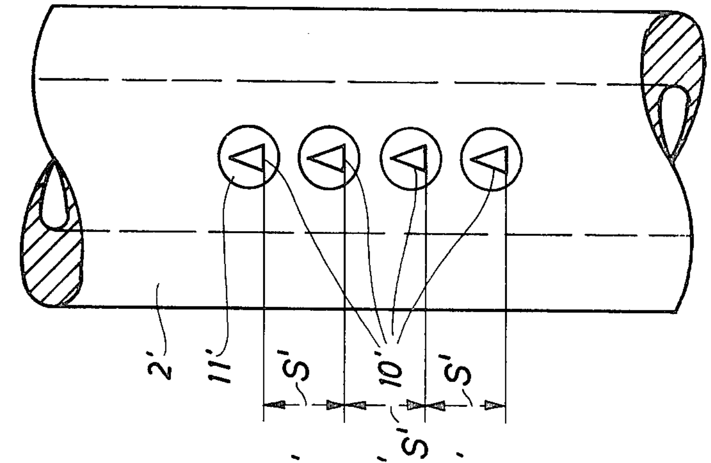
FIG. 4 is a front view of a control cylinder for the control piston illustrated in FIG. 3.

The control piston 1' illustrated in FIG. 3 is received in the bore of the control cylinder 2' shown in FIG. 4. The four openings 10' provided in accordance with the number of discharge channels 11' are disposed about each other along the length of the control cylinder 2' and are at a distance from each other which corresponds to the pitch S' of the spiral groove 5' of the control piston 1' in FIG. 3.

Figure 5:
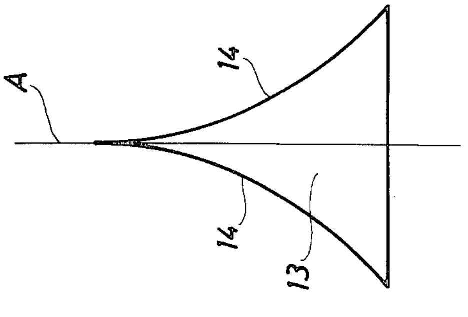
FIG. 5 is a top view of a constructional form of an opening of an enlarged scale.

FIG. 5 shows a triangular opening 13 whose lateral edges 14 forming the vertex are curved inwards. The curve of the lateral edges 14 can have any radius or else be curved to any extent outwards or inwards and thus, depending on the requirements, may alter the opening of the corresponding throttle cross-section, together with the control edge of the control piston. In this constructional form, too, the symmetrical axis A laid through the vertex of the opening 13 runs parallel to the control cylinder's longitudinal axis.

Figure 6:
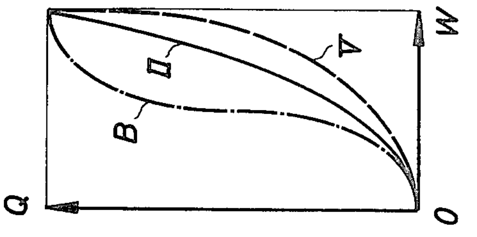
FIG. 6 is a diagram indicating the ratio of the angle set or path covered by the control piston to the throttle cross-section changed thereby.

The ratio of the amount of fuel dosed by the metering valve at the control ports is indicated by the diagram in FIG. 6. Q is the amount of fuel dosed by the throttle cross-section formed by the control edge and the opening, and W is the path or angle of rotation of the control piston. The line II represents the amount of fuel dosed in a quadratic ratio by a triangular opening 10, while the broken line V represents the amount of fuel which is dosed, for example, through an opening 13. (FIG. 5) The sinusoidal dot-and-dash line B shows the amount of fuel dosed in the case of a metering valve which is mentioned as prior art in the introduction to the description.

Fuel dosing valves according to the invention are relatively simple to produce and with the proposed design can be made relatively small. They have the further advantage that they are not over-sensitive to particles of dirt present in the fuel and operate substantially independently of the temperature and viscosity of the fuel. A bigger or smaller rotation range for the control edge relative to the opening can be achieved according to the choice of pitch and number of spiral threads.

What is claimed is:

1. A fuel metering valve for fuel injection apparatus for a mixture compressing, spark-ignition internal combustion engine with continuous fuel injection comprising an induction manifold and a plurality of fuel injection nozzles, the valve having a control cylinder with ports equal in number to the number of nozzles and in communication therewith, a control piston arranged to be rotatable in said control cylinder and having a control edge cooperating with said ports for metering an amount of fuel in accordance with the amount of air flowing through said induction manifold, said piston having a continuous spiral groove in uncontrolled connection with a feed passage, one flank of said groove acting as a control edge common to all ports and forming a variable throttle cross-section together with said ports, said ports having a generally triangular cross-section and being staggered along the length of said cylinder relative to each other in conformity with the pitch of said spiral groove in the piston.

2. A fuel valve according to claim 1, in which each port has a major axis of symmetry which lies substantially parallel to the longitudinal axis of said control cylinder.

3. A fuel valve according to claim 1, in which the lateral edges of each port are curved.

4. A fuel metering valve according to claim 1, in which said ports are distributed around the circumference of the control cylinder.

5. A fuel metering valve according to claim 1, in which said ports are spaced lengthwise parallel to the cylinder axis and in alignment with each other.

* * * * *